(12) United States Patent
Sheahan (10) Patent No.: US 6,591,971 B1
(45) Date of Patent: Jul. 15, 2003

(54) SILAGE MOVER

(76) Inventor: Donald T. Sheahan, 15807 San Rd., Reedsville, WI (US) 54230

( * ) Notice: Subject to any disclaimer, the term of this patent is extended or adjusted under 35 U.S.C. 154(b) by 101 days.

(21) Appl. No.: 09/694,385

(22) Filed: Oct. 23, 2000

(51) Int. Cl.[7] .............................................. B65G 65/16
(52) U.S. Cl. ............. 198/518; 241/101.71; 241/101.72; 241/101.74; 198/304; 198/306
(58) Field of Search .................. 198/517, 518, 198/306, 304; 241/101.71, 101.72, 101.74, 101.742, 605; 414/502, 528, 526, 133

(56) References Cited

U.S. PATENT DOCUMENTS

| | | | | |
|---|---|---|---|---|
| 1,143,897 A | * | 6/1915 | Flexner et al. ............... 220/501 |
| 1,353,841 A | | 9/1920 | Neighbour | |
| 1,872,457 A | * | 8/1932 | Kern ........................... 414/133 |
| 2,773,586 A | | 12/1956 | Schmidtke | |
| 2,862,598 A | * | 12/1958 | Oswalt ........................ 198/519 |
| 2,890,783 A | | 6/1959 | Decat | |
| 3,121,488 A | | 2/1964 | Chittock | |
| 3,390,755 A | | 7/1968 | Stacy | |
| 3,472,298 A | | 10/1969 | Vinogradov et al. | |
| 3,556,289 A | | 1/1971 | Erickson | |
| 3,563,364 A | | 2/1971 | Arndt et al. | |
| 3,724,635 A | | 4/1973 | Byrd | |
| 3,788,444 A | | 1/1974 | McWilliams | |
| 3,976,186 A | | 8/1976 | Neier | |
| 3,985,305 A | | 10/1976 | Williamson et al. | |
| 4,157,164 A | | 6/1979 | Helm et al. | |
| 4,185,731 A | | 1/1980 | Van Drie | |
| 4,258,486 A | * | 3/1981 | Barre .......................... 180/6.2 |
| 4,410,142 A | * | 10/1983 | Carlson ........................ 241/18 |
| 5,515,961 A | * | 5/1996 | Murphy et al. .............. 198/302 |
| 5,645,232 A | * | 7/1997 | Staples et al. ................. 241/60 |
| 6,109,552 A | * | 8/2000 | Strankman .............. 241/101.72 |
| 6,185,990 B1 | * | 2/2001 | Missotten et al. .............. 73/73 |
| 6,186,311 B1 | * | 2/2001 | Conner ........................ 198/300 |

FOREIGN PATENT DOCUMENTS

DE 2229982 1/1973

* cited by examiner

Primary Examiner—Christopher P. Ellis
Assistant Examiner—Richard Ridley
(74) Attorney, Agent, or Firm—Ryan Kromholz & Manion, S.C.

(57) ABSTRACT

A silage cutter and loader assembly including a beater assembly for removing silage from a bunker and transferring the silage via a cross auger to a conveyor for transport to an independent container. The assembly further includes independently arranged wheels, at least two of the wheels being rotatable about a respective vertical axis.

3 Claims, 11 Drawing Sheets

SILAGE MOVER

BACKGROUND OF THE INVENTION

The present invention relates generally to a silage cutter and more particularly to a silage cutter and loader capable of lateral movement.

Silage and other agricultural materials are commonly stored in bunkers or specially constructed trenches. These bunkers can be built to satisfy any required storage capacity, and widths of up to three-hundred feet are not uncommon. Stored material is packed tightly into the bunker, and the exposed outer surface cures and protects the interior silage from spoilage and weathering. Manual removal of the material can allow sprawling, air infiltration and increased spoilage. Manual removal is also time consuming, labor intensive and can become difficult in colder temperatures when the material is frozen.

Machines specifically designed to remove agricultural material from bunkers are well known in the art. U.S. Pat. No. 3,121,488 describes a silage cutter that removes a section of material from the front of a bunker. It utilizes a vertically moving, revolving cutter head mounted on a horizontally moving frame. The machine is positioned in front of the bunker and the cutter head is lowered, thus removing a section of material. Removed material is moved to a container by a conveyor. The horizontally moving frame is then shifted laterally and the cutter head is lowered again. This continues until the frame has traveled the substantial width of the machine, wherein the entire machine is backed away from the bunker and repositioned adjacent to the first position. The removal operation is again performed, and the repositioning will continue until material has been removed from the entire width of the bunker.

Existing silage cutters convey removed material away from the bunker, wherein a separate container must be positioned to catch the conveyed material. The container is typically placed directly behind the silage cutter. Difficulty arises each time the silage cutter must be repositioned. The container must first be moved clear of the silage cutter's path. The silage cutter must be backed away from the bunker, then turned and driven forward to the new position. Once it is in place, the container must be moved into the correct position to catch the material. The sequence of operations required creates difficulty for a single person to effectively remove silage from a bunker.

The difficulty of operations has induced many bunker owners to use construction or landscaping equipment, such as a front-end loader or payloader, to remove silage. The greater mobility of a front-end loader allows faster removal of silage without the need to move the container. Unfortunately, the use of such machinery creates sprawling of the silage and air infiltration, while at the same time reducing the ability to monitor the volume of silage removed.

Accordingly, there is a need for an apparatus capable of cleanly removing a known amount of silage off the front of a bunker, that is also capable of lateral movement. The ability to remove an amount of silage equal to the width of the apparatus with a single motion will also increase efficiency.

SUMMARY OF THE INVENTION

According to the present invention, the foregoing and other objects and advantages are attained by providing an apparatus capable of removing silage from a bunker, having power driven wheels that are capable of turning about a vertical axis to the point of allowing powered lateral movement.

A further object of the present invention is the ability to remove an amount of silage substantially equal to the width of the apparatus in a single motion.

A further advantage of the invention is the ability to monitor the amount of silage removed by each sequence, thereby allowing the amount of silage used per day to be easily calculated and known.

The present invention is a silage cutter and loader having a revolving beater, a vertical frame on which the beater is mounted, a revolving cross auger positioned near ground level, a conveyor and one or more specially designed wheel assemblies that allow lateral movement. The revolving beater and cross auger span the entire width of the machine, allowing the machine to remove a full width of silage with a single motion. A gasoline engine drives a hydraulic pump that supplies hydraulic power for all operations of the machine. Hydraulic valves in a central control panel allow the operator to control all operations from the driver's seat.

The machine is first positioned with the revolving beater raised and the cross auger abutting the silage to be removed. The machine may be driven up to the silage in the same fashion as a conventional silage removing machine, and a container may be placed to catch freed material. As the revolving beater lowers onto the silage, it loosens and frees material packed into the bunker. Freed material falls to the cross auger, where it is moved to the central conveyor and carried away.

When the revolving beater has finished its downward ravel, the drive wheels may be turned perpendicular to the longitudinal axis of the machine, allowing lateral movement along the face of the bunker. The beater may be raised, and the machine and the container may be repositioned quickly. The beater is again lowered, and the sequence may be repeated until an appropriate amount of material is removed.

The machine removes approximately the same amount of material with each downward motion, thereby allowing the amount of material used per day to be easily monitored.

These and other features, aspects and advantages of the present invention will become apparent in the descriptions that follow.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
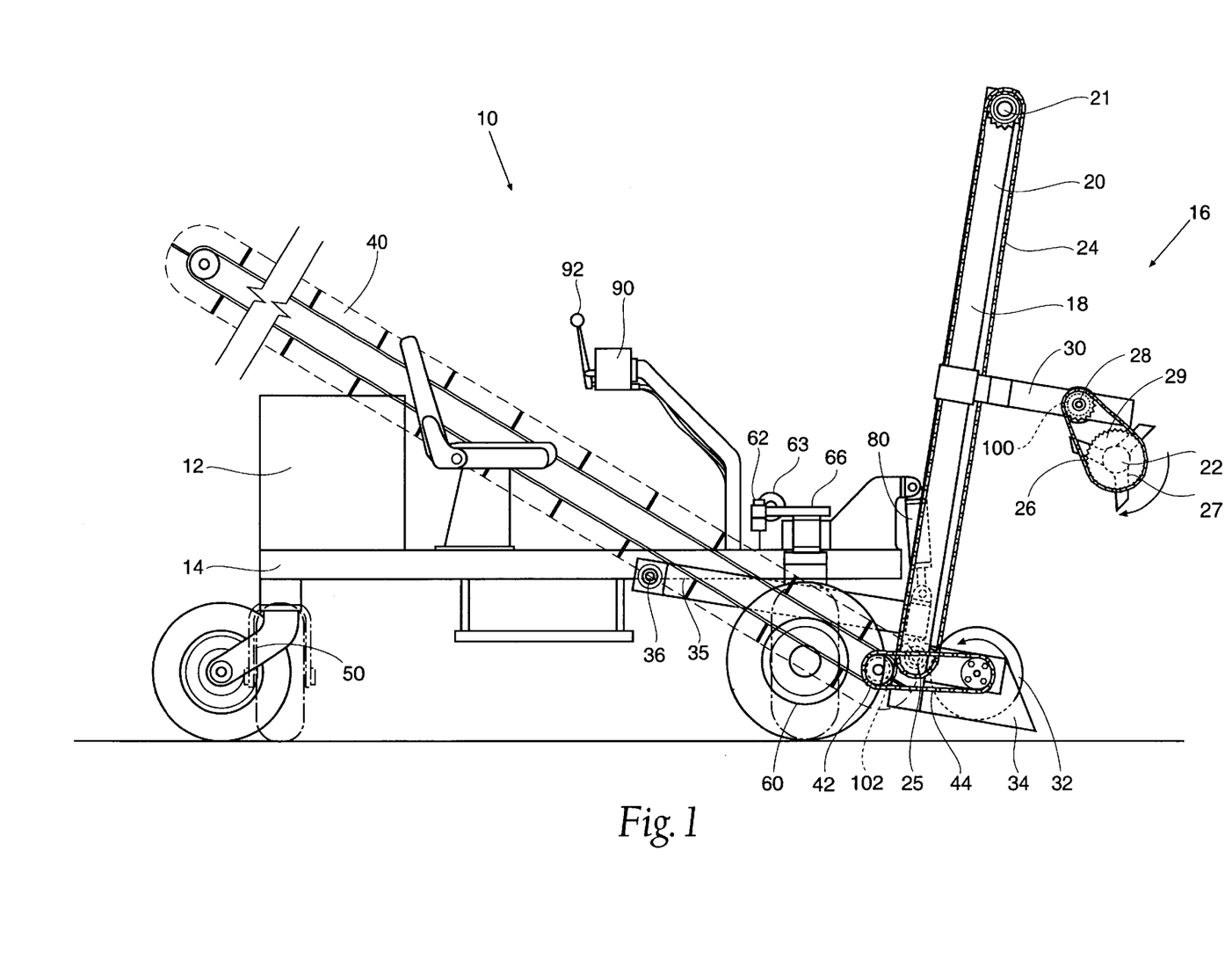
FIG. 1 is a side elevational view of the present invention.
Figure 2:
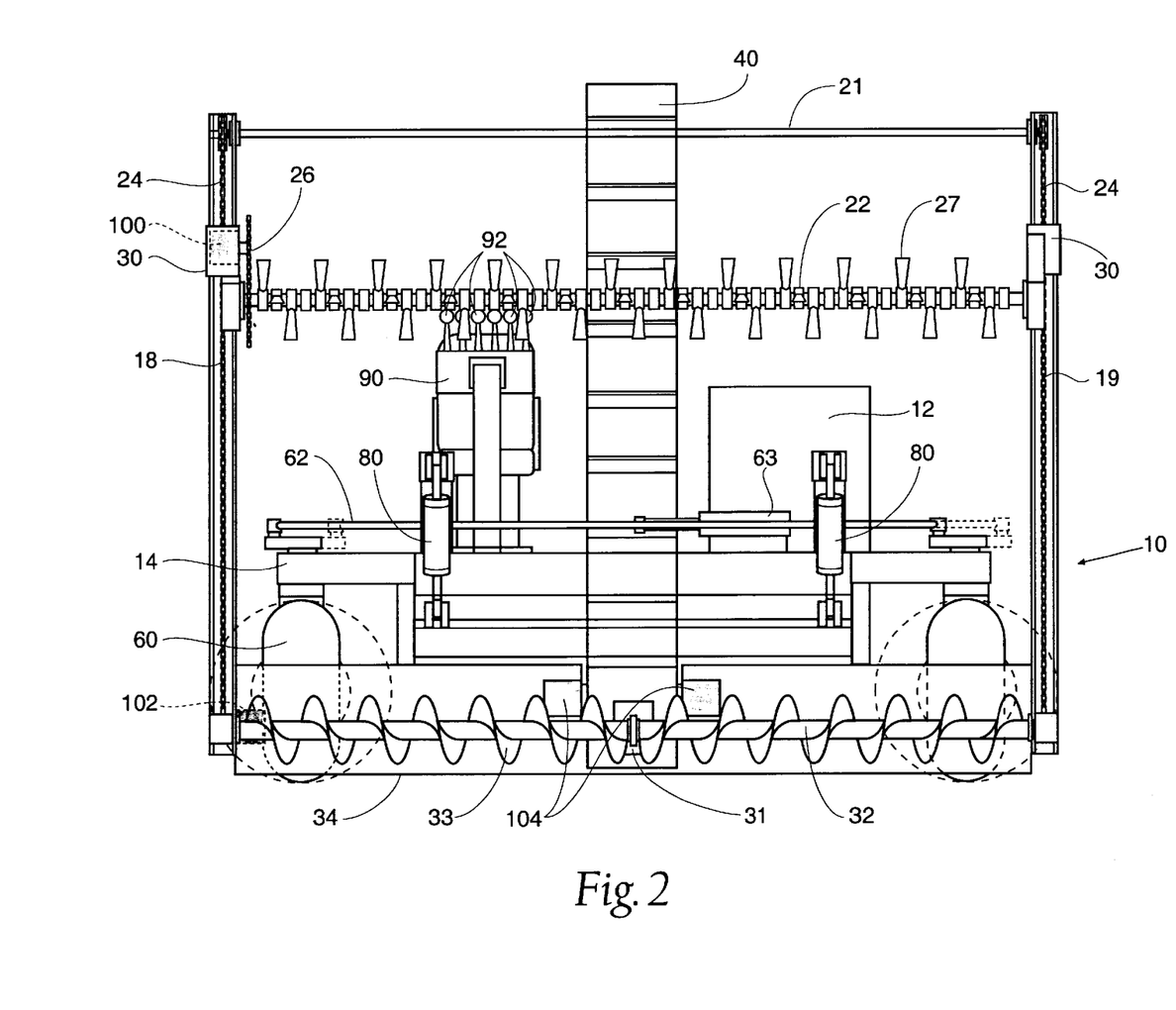
FIG. 2 is a front elevational view of the present invention.
Figure 8:
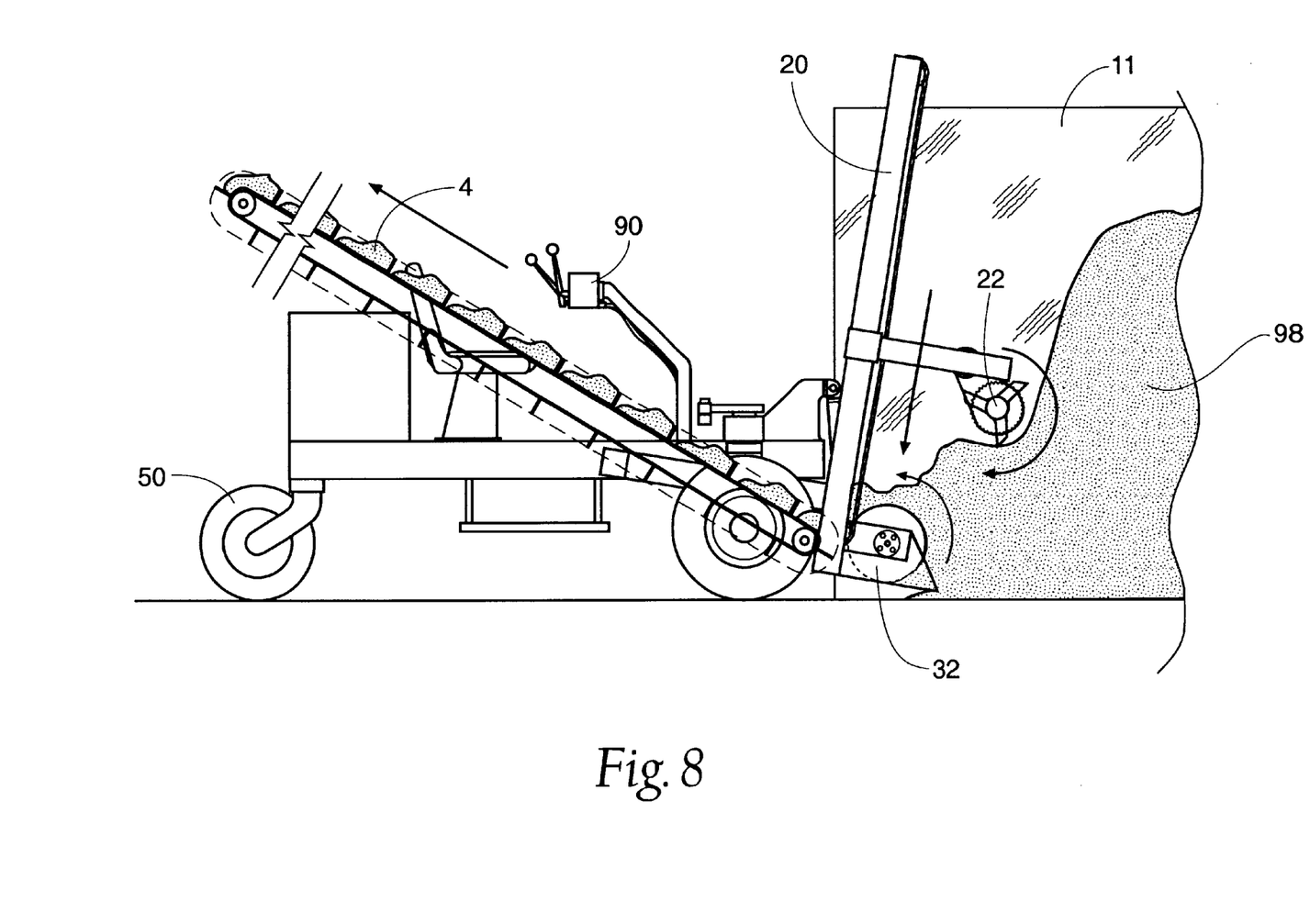
FIG. 8 is a side elevational, environmental view of the material mover of the present invention removing material from a bunker.
Figure 9:
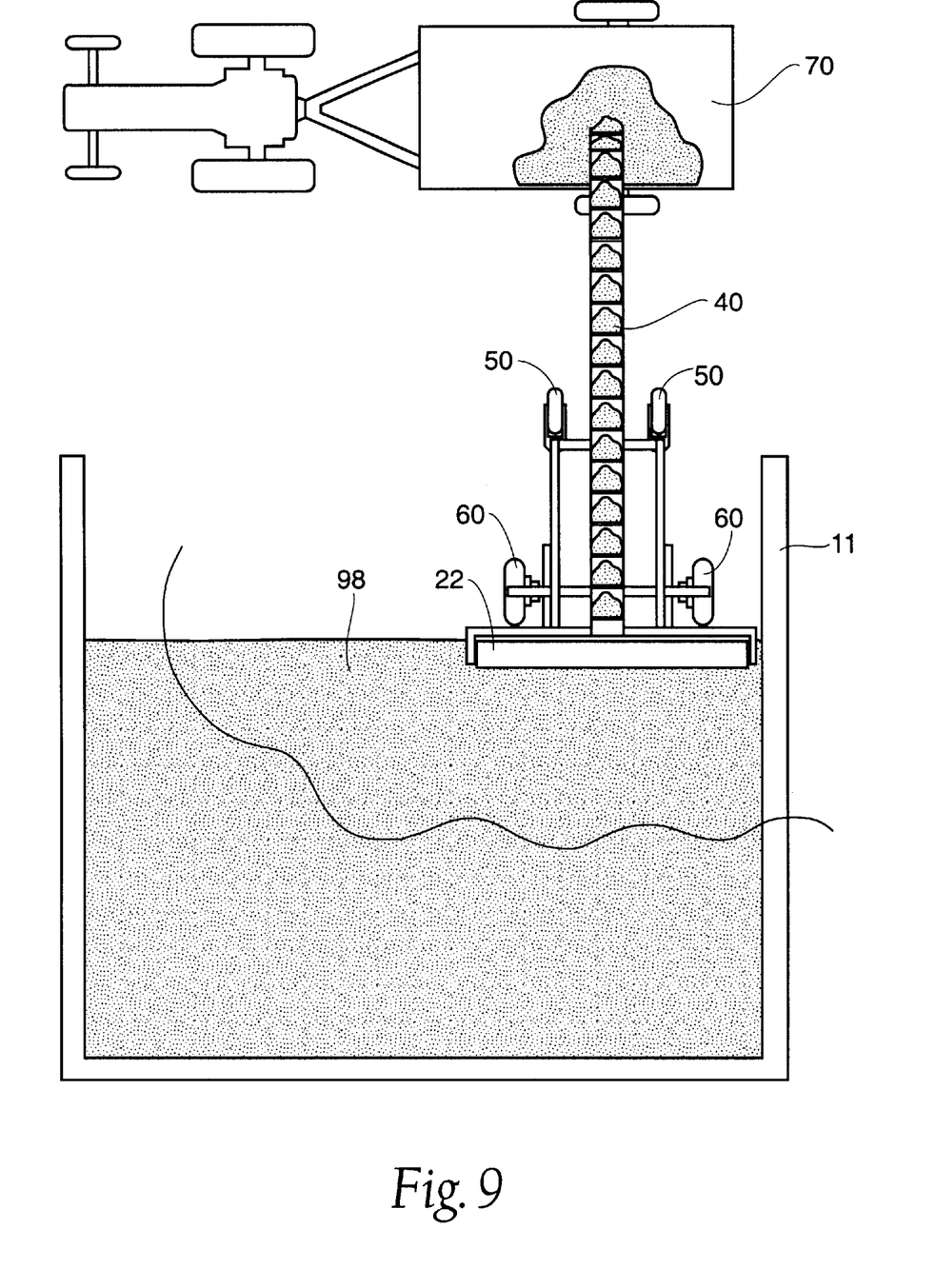
FIG. 9 is a top environmental plan view of the material mover of the present invention removing material from a bunker.
Figure 10:
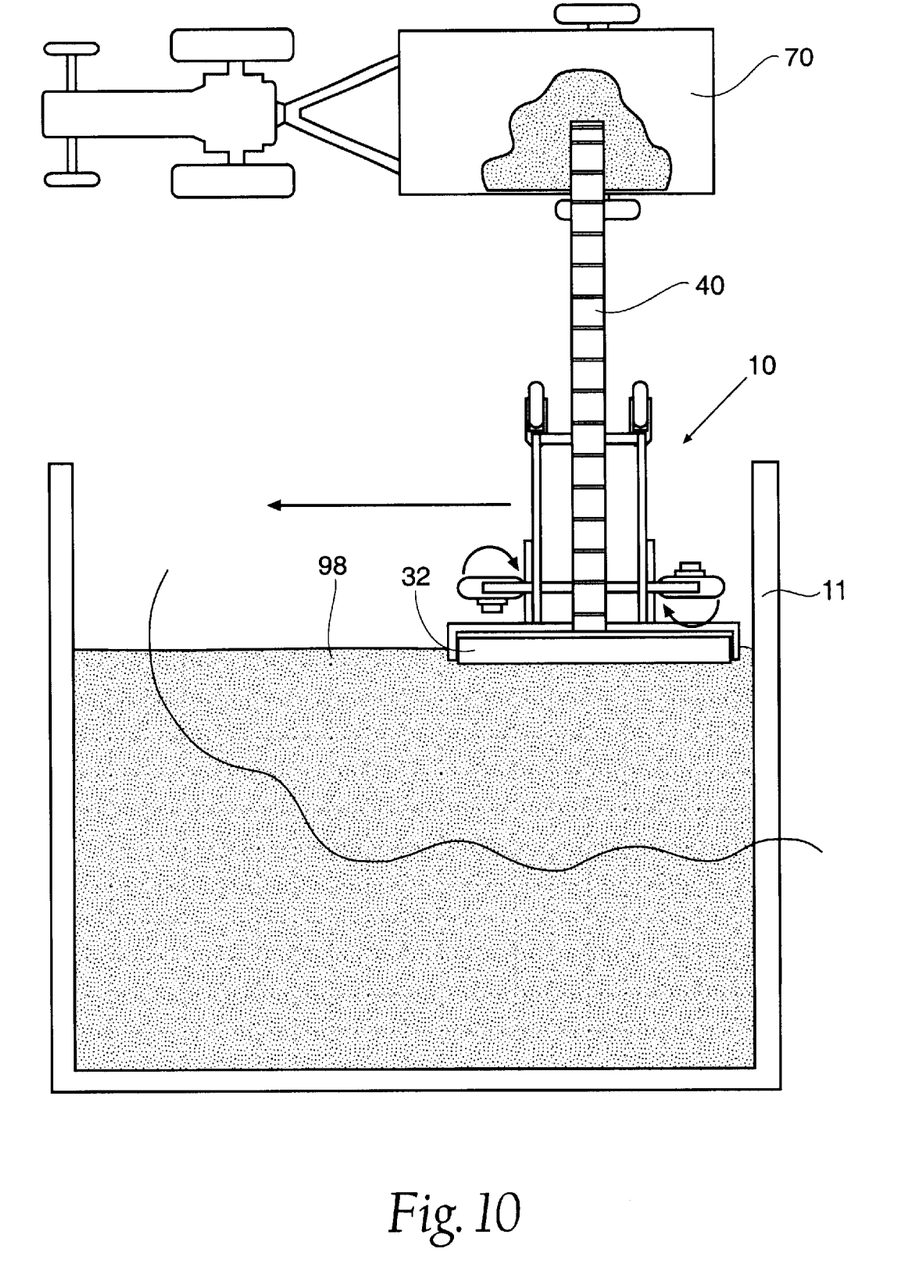
FIG. 10 is a top environmental plan view of the material mover of the present invention having the front drive wheel assemblies turned to allow lateral movement.
Figure 11:
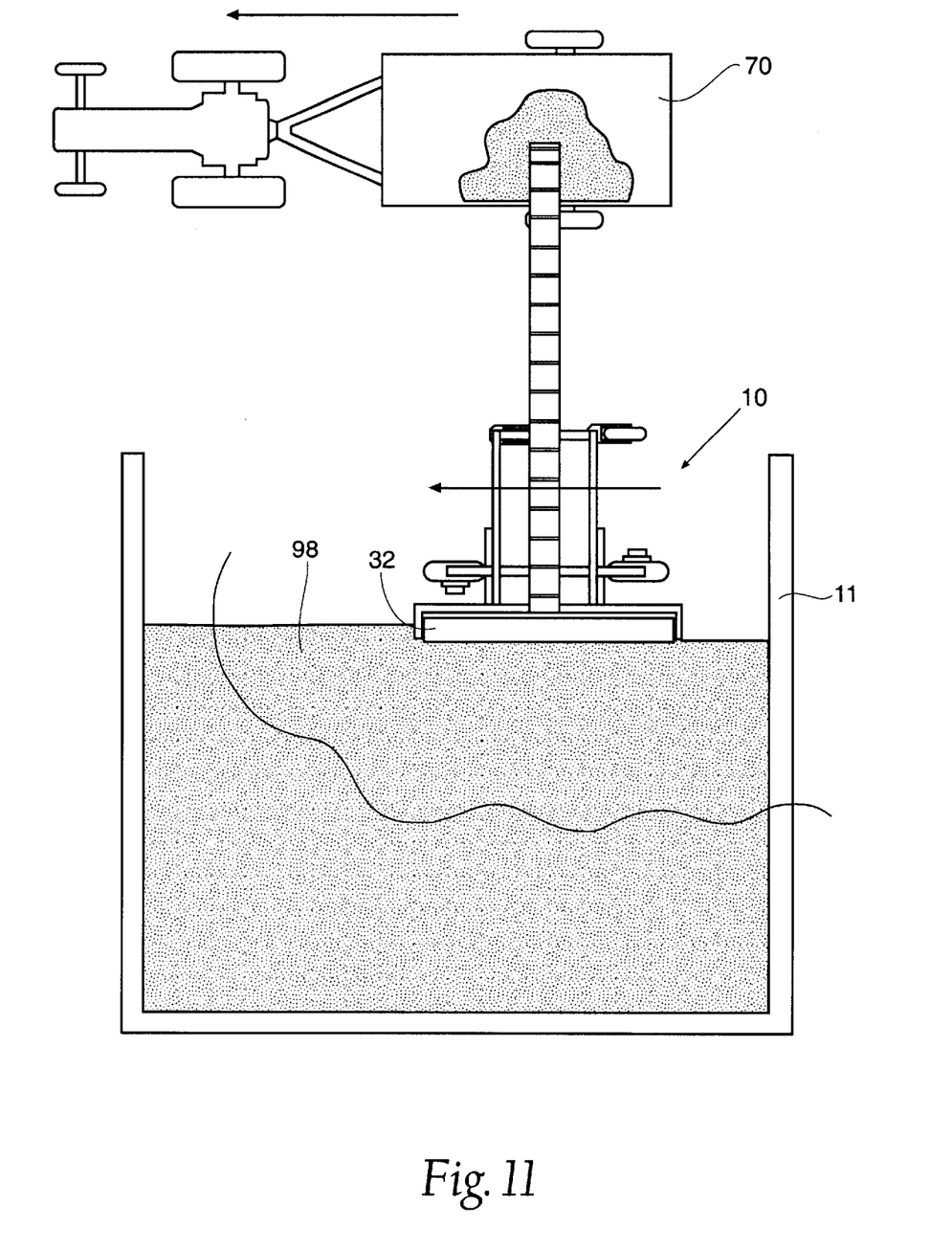
FIG. 11 is a top environmental plan view of the material mover of the present invention during lateral movement.

With particular reference to FIGS. 1 and 2, the present invention comprises an improved machine or apparatus 10 for removing agricultural material 98 (see FIGS. 6–11 inclusive) from a storage bunker 11 (see FIGS. 9–11). In brief, the apparatus 10 includes a horizontal structural frame 14, a supporting revolving beater shaft 22 rotatably mounted on laterally spaced masts 18 and 19 of an upright frame 20, a revolving cross auger 32, a conveyor 40, one or more specially designed drive wheel assemblies 60, one or more passive wheel assemblies 50 and a hydraulic pump 12, powered by a gasoline engine (not shown), to supply hydraulic pressure to a plurality of hydraulic motors for operation of the machine. The use of hydraulics are well known in the art, as the use of electric motors has been known to ignite airborne silage dust.

Again, with specific reference to FIGS. 1 and 2, a preferred embodiment of the present invention is depicted. A driver may control all operations via a control box 90 having a plurality of rocker arm levers 92. These levers 92 control hydraulic valves, which open or close hydraulic lines supplying hydraulic power throughout the apparatus 10. A front assembly 16 is supported by the structural frame 14 on a pivot connection 36. The front assembly 16 may rotate about the pivot connection 36, and may be raised by means of a hydraulic piston 80 for greater mobility. The front assembly 16 includes a connecting arm 35, the vertical frame 20 and the cross auger 32. Attached to the vertical frame 20 are cantilevered beaters support members 30, which support the revolving beater shaft 22. The upright frame 16 is of sufficient height to allow the revolving shaft 22 to be raised above material 98 stacked in the bunker 11, as will be later shown and described.

The preferred revolving beater shaft 22 horizontally spans the substantial width of the apparatus 10, and includes a cutter mechanism including a plurality coaxially spaced blades 27 designed to cleanly cut agricultural material 98, such as silage or the like (see FIG. 6), from the storage bunker 11. A hydraulic motor 100 (shown in phantom, FIGS. 1 and 2) mounted on, and supported by, the beater support member 30 turns a beater drive sprocket 28. A drive chain 26 connects the drive gear sprocket 28 to a second driven sprocket 29, which is affixed to the beater shaft 22. In the preferred embodiment, the driven sprocket 29 has a larger diameter than the drive sprocket 28, thereby reducing the rotational speed of the beater shaft 22 and increasing available torque. Gears of different sizes may be substituted to adjust the rotation speed and available torque as desired. The beater shaft preferably rotates at a fairly low speed, such as sixty revolutions per minute or less.

The support members 30, which carry the beater shaft 22, are slidably mounted on the upright frame 20. The members 30 may be raised by one or more hydraulic motors, 102 (shown in phantom, FIGS. 1 and 2), and may be power-driven driven in either longitudinal direction with respect to the upright frame 20, or be permitted to drop downwardly by gravitational force. In the present embodiment, the support members 30 are respectively connected to lift chains 24 on either side of the machine 10. Movement of the lift chains 24 are synchronized by an upper connecting rod and gear assembly 21. A hydraulic motor (not shown), drives a lower lift gear 25, thereby moving the lift chains 24 and raising the beater shaft 22 and support members 30, which may then be lowered by gravity. A hydraulic choke may be used to slow the downward travel.

Agricultural material 98 removed by the beater blades 27 falls into the cross auger 32, which horizontally spans the substantial width of the machine 10 (see FIG. 2). The auger 32 has blades 33 oriented to move material to the auger midpoint 31 during rotation. Angling of the blades 33 is reversed on opposite sides of the midpoint 31 to convey the material 98 towards the conveyor 40. As material 98 is brought to the midpoint 31, it is picked up by the conveyor 40 and delivered to an awaiting independent container 70 (see FIG. 9). A guard frame 34 prevents material from spilling to the sides or behind the auger 32, and assists in directing material 98 towards the conveyor 40. A single hydraulic motor 104 (see FIG. 2) powers the auger 32 rotation and conveyor 40 operation. The motor is connected to and turns the lower roller 42 of the conveyor 40. A belt or chain 44, also connected to the lower roller 42,, rotates the auger 32.

Figure 3:
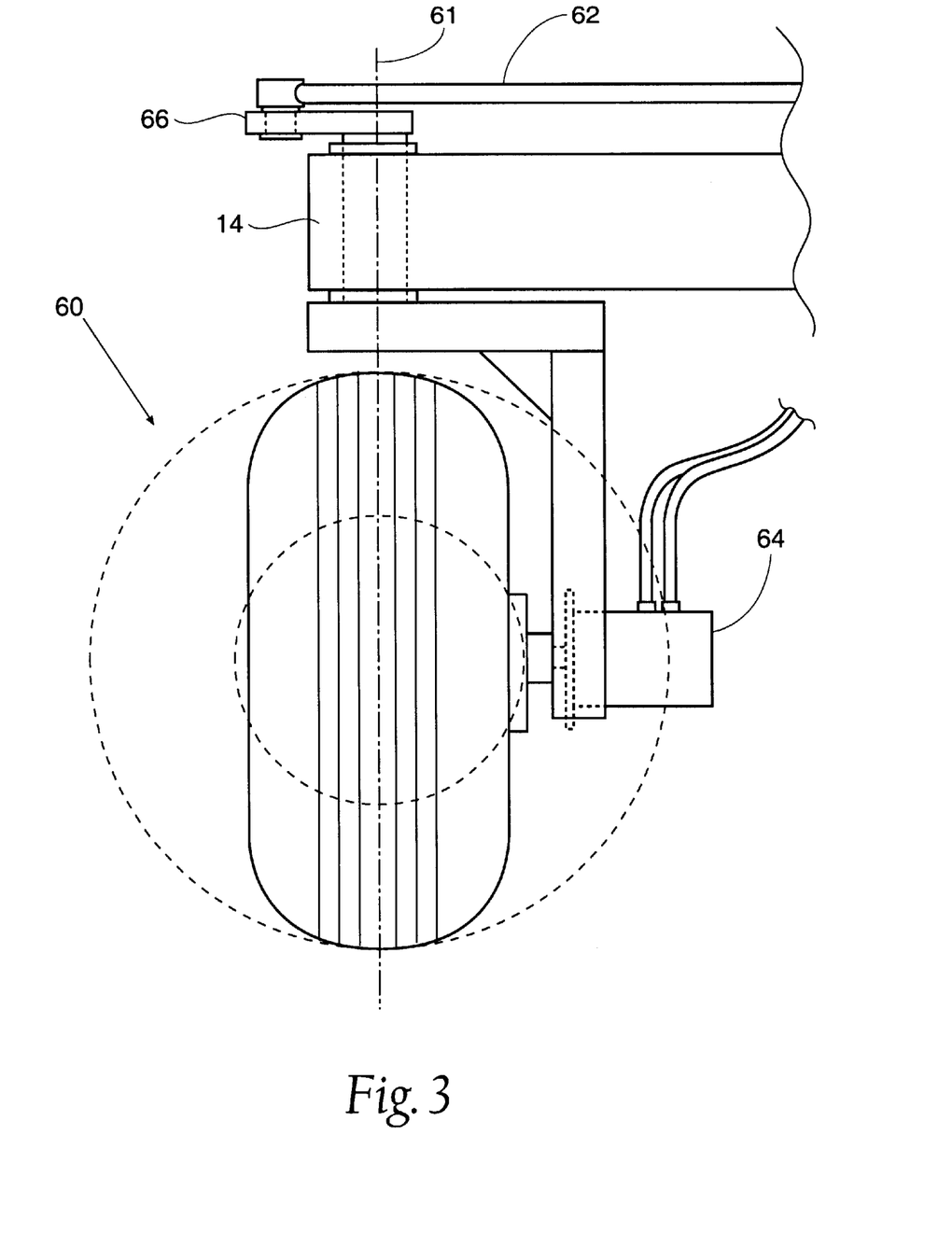
FIG. 3 is a fragmentary elevational view depicting an embodiment of a present drive wheel assembly for the present invention.
Figure 4:
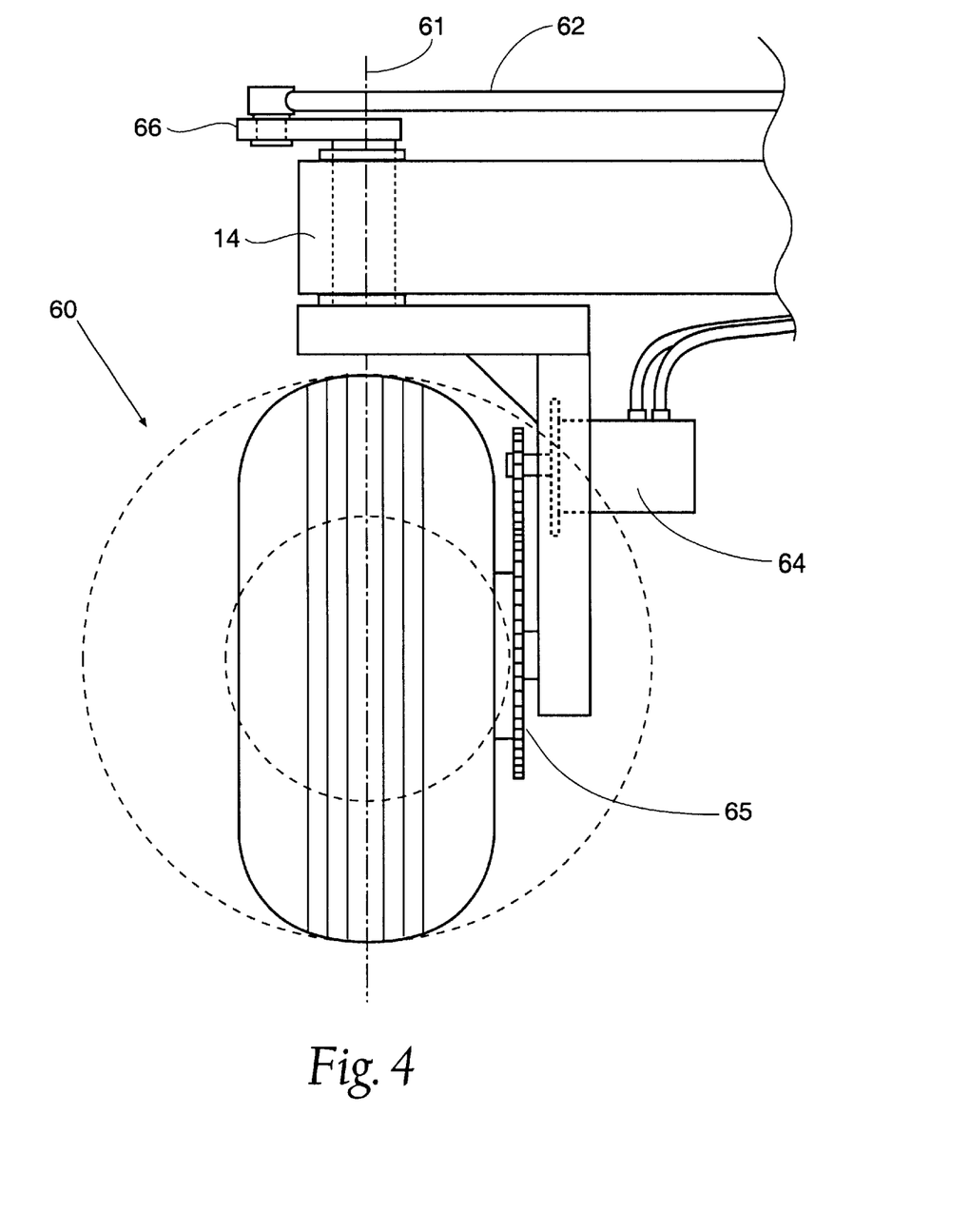
FIG. 4 depicts the drive wheel assembly of FIG. 3 rotated ninety degrees.

The machine 10 is supported by a number of wheels, including one or more passive caster wheel assemblies 50, and one or more drive wheel assemblies 60. Referring also to FIG. 3, in the preferred embodiment, both front wheels are drive wheel assemblies 60. Each drive wheel 60 is able to be powered forward or powered reverse, independently from any other wheel, by its own hydraulic motor 64. The assembly 60 may include reduction gears 65 (see FIG. 4) to reduce speed and increase available torque.

Figure 5:
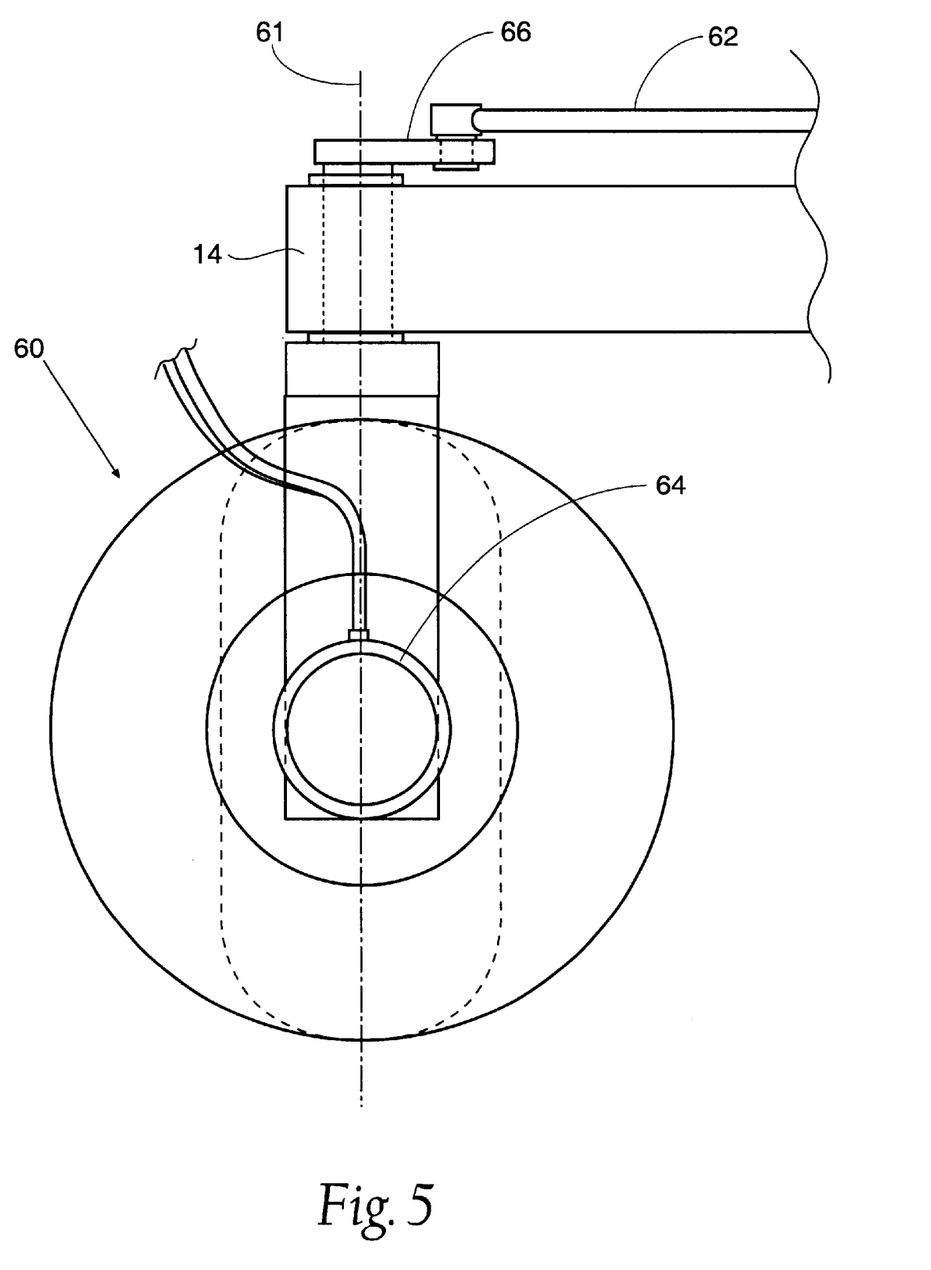
FIG. 5 depicts an alternative embodiment of the drive wheel assembly of this invention.

Referring also to FIG. 5, each drive wheel assembly 60 is able to rotate about a vertical axis 61, has a range of travel of at least ninety degrees and is able to turn parallel or perpendicular to the longitudinal axis of the machine 10. In the present embodiment 2, steering is accomplished by a means of hydraulic piston 63 and a steering linkage 62 (see FIG. 2), which act upon a connecting arm 66 fixedly attached to the wheel assembly 60. As the piston 63 extends or retracts, the steering linkage 62 will turn each wheel assembly 60 about its respective vertical axis 61. When the piston 63 is fully retracted, the wheels assemblies 60 are positioned to allow sidewise lateral movement of the machine 10.

The present steering assembly is used because it allows the drive wheels 60 to be rotated about their true central vertical axis 61. Many conventional steering systems rotate the wheels about a vertical axis offset from the vertical axis of the wheel. If such a system were used, the drive wheels would become staggered when arranged for sidewise lateral movement, reducing overall stability of the machine 10. The present steering assembly gives the machine 10 better stability than a conventional system because it maintains the same points of contact with the ground at all times. While any steering assembly allowing the drive wheels 60 to be rotated about their true central vertical axis 61 is preferred, a conventional steering system capable of turning the wheels to allow lateral movement may be used without departing from the present invention.

Maneuverability of the machine 10 is greatly increased by the ability to power each drive wheel 60 forward or reverse independently. In addition to the conventional steering means of turning the wheels 60 to point in the direction of desired travel, the present invention may be turned by powering only one wheel 60 forward or reverse, or by powering the drive wheels 60 in opposite directions. Such an operation allows the machine 10 to turn with a much smaller turning radius than with a conventional steering system.

Figure 6:
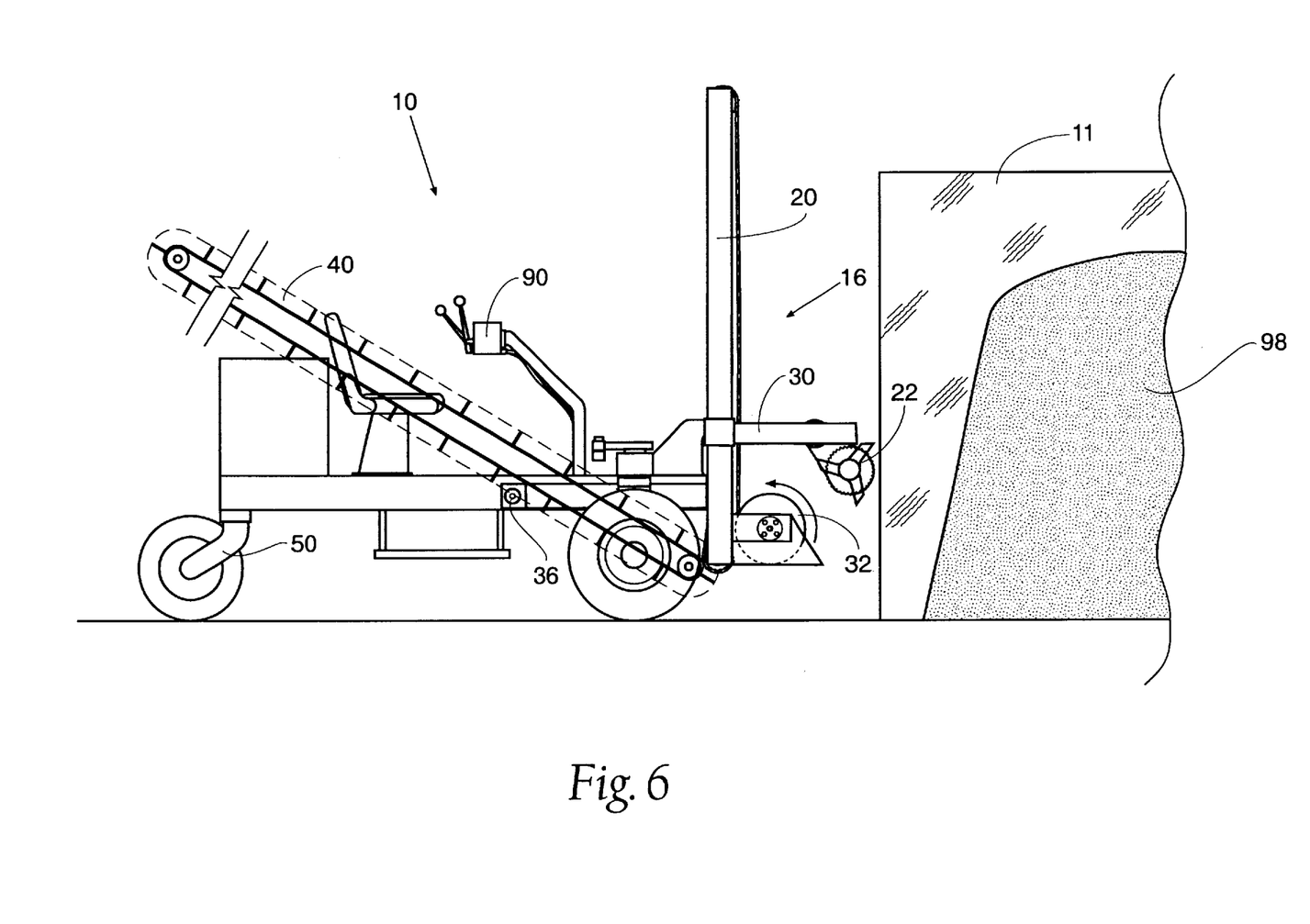
FIG. 6 is a side elevational, environmental view of the material mover of the present invention approaching a material storage bunker.
Figure 7:
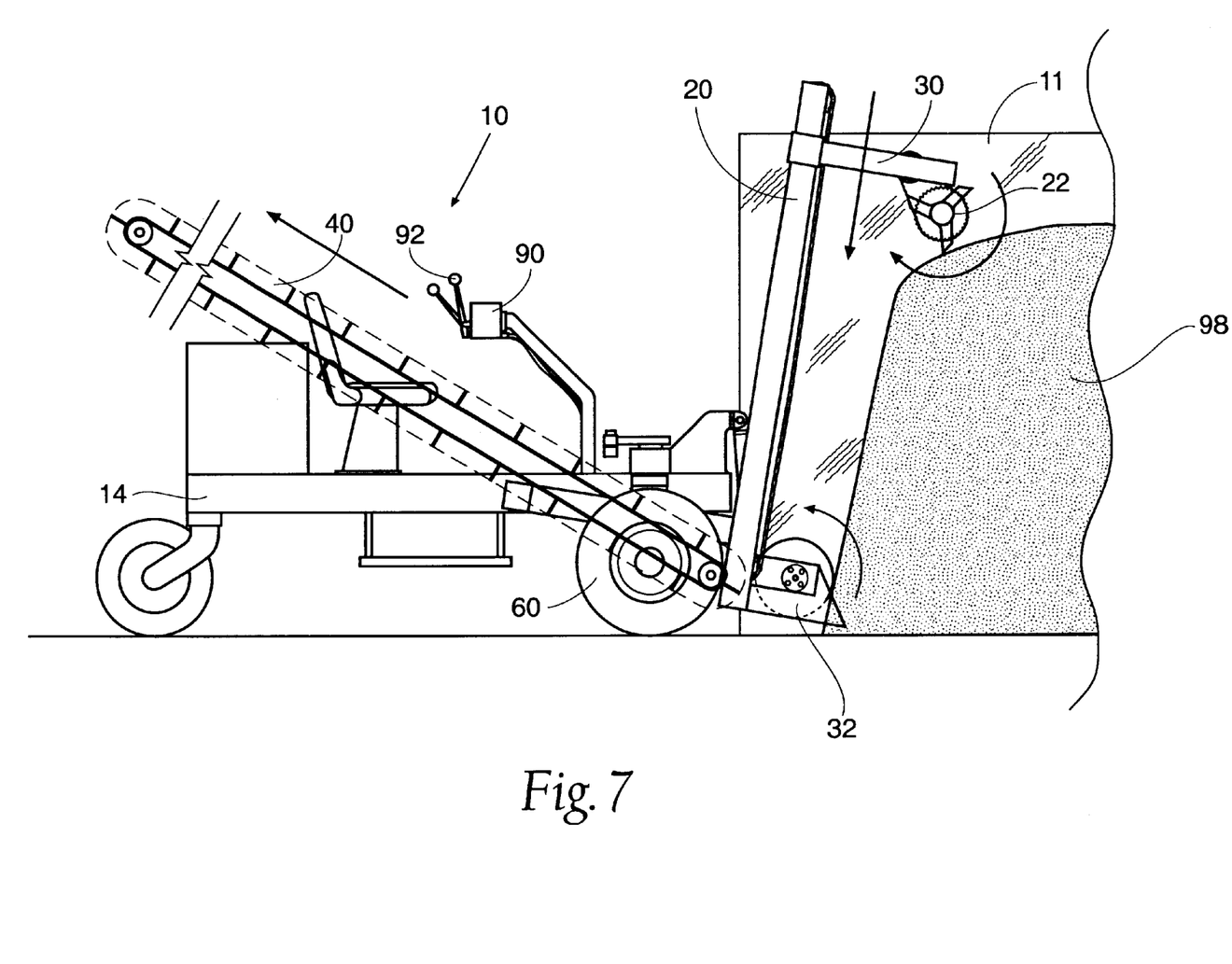
FIG. 7 is a side elevational, environmental view of the material mover of the present invention in position to remove material from a bunker.

FIGS. 6 through 8, inclusive, depict the present apparatus removing and conveying agricultural material 98 from a bunker (not shown). As depicted in FIG. 6, the apparatus 10 may be driven up to the storage bunker with the front assembly 16 raised for greater mobility. The front assembly 16 may be lowered as the apparatus 10 approaches the bunker.

With reference to FIG. 7, the revolving beater shaft 22 is raised on the vertical frame 20, and the machine 10 is positioned with the cross auger 32 abutting the material 98 to be removed. The hydraulic motor for rotating the beater 22 is switched on, as is the motor that controls the cross auger 32 and conveyor 40. As the beater 22 travels downward on the vertical frame 20, it loosens and frees material 98 packed into the bunker. Freed material 98 falls to the cross auger 32 and is brought to the central conveyor 40, which carries it away. FIG. 8 depicts the present invention partially through a material removal sequence.

As shown in FIG. 9, a separate container 70 may be placed to catch the loose material delivered by the conveyor 40. When the beater 22 has finished its downward travel, an amount of material 98 substantially equal to the width of the machine 10 has been removed. The machine may now be repositioned. The beater shaft 22 should again be raised to prevent interference during lateral movement between the beater shaft 22 and any adjacent material 98 still packed into the bunker. If desired, the entire front assembly 16 may be raised. The steering piston 63 is contracted until the drive wheel assemblies 60 are positioned to allow lateral movement, as depicted by FIG. 10.

FIG. 11 shows the apparatus 10 moving laterally along the face of the material 98, with no need to back away from the bunker. The container 70 may be moved laterally with the apparatus 10. If required, the drive wheels 60 may be turned back to the forward drive positions after lateral movement for minor adjustments in positioning the apparatus 10. The revolving beater shaft 22 may be lowered, and the removal sequence may be repeated as necessary.

With each downward travel of the revolving beater shaft 22, an amount of material 98 is cleanly removed from the bunker. The material 98 remaining in the bunker is left tightly packed and undisturbed. The volume of material 98 removed with each removal sequence can be easily calculated using the known height, width and depth of the cut. This allows the amount of material 98 removed per day to be easily monitored.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An apparatus for removing agricultural material from a bunker, the apparatus comprising a unitary, self-propelled carriage including:

a straight upright frame, said frame including oppositely disposed straight upright members;

a single revolvable beater assembly, said beater assembly including an axle of a predetermined length and extending across said frame, and said axle being rotatably supported by said oppositely disposed straight upright members, said axle supporting a plurality of freely, radially extending, axially spaced, beater blades, each blade being arranged to dislodge said material from said container;

means for raising and lowering said beater assembly relative to said straight upright member;

a revolvable cross auger positioned proximate to ground level and having a length substantially the same as the length of said beater assembly, said auger being arranged to collect and transport material beaten and removed from said container;

a conveyor directly communicating with said cross auger for transporting removed material from said cross auger;

a plurality of wheels, each of said wheels being rotatable around a vertical axis, at least one of said wheels is a power driven drive wheel;

reversible power means for supplying power to said power driven drive wheel; and said power driven drive wheel having a range of motion allowing alternative parallel or angular movement of the apparatus with respect to the container.

2. The apparatus of claim 1, wherein said apparatus includes a horizontal support structure and said straight upright frame is pivotally supported by said support structure and self-contained power means for pivotally rotating said upright frame angularly relative to and away from said bunker and material to be removed therefrom.

3. The apparatus of claim 1, wherein said apparatus includes power means for rotating said beater, raising and lowering said beater and for rotating said cross auger.

\* \* \* \* \*